United States Patent [19]

Kveton

[11] Patent Number: 5,102,618
[45] Date of Patent: Apr. 7, 1992

[54] VAPOUR PHASE CATALYTIC EXCHANGE APPARATUS

[75] Inventor: Otto K. Kveton, Toronto, Canada
[73] Assignee: Ontario Hydro, Toronto, Canada
[21] Appl. No.: 497,073
[22] Filed: Mar. 21, 1990
[51] Int. Cl.⁵ ............................................. G21C 9/00
[52] U.S. Cl. ................................... 376/301; 376/310; 376/146
[58] Field of Search ............... 376/301, 313, 310, 195, 376/314, 146; 423/255, 580

[56] References Cited

U.S. PATENT DOCUMENTS

| | | | |
|---|---|---|---|
| 3,937,649 | 2/1976 | Ridgely | 376/310 |
| 4,217,332 | 8/1980 | Hindin et al. | 423/249 |
| 4,331,522 | 5/1982 | Pierini | 423/580 |

Primary Examiner—Donald P. Walsh
Assistant Examiner—Meena Chelliah
Attorney, Agent, or Firm—Ridout & Maybee

[57] ABSTRACT

A reactor for use in the separation of tritium from tritiated water by the vapor phase catalytic exchange process comprises an evaporator section, a superheater section, a catalytic reactor section and a condenser section serially arranged within a common casing structure defining a unitary pressure vessel. In a multistage plant the reactors are interconnected to provide for countercurrent flow of the water and hydrogen gas from stage to stage, with co-current contact in the catalytic reactor section of each stage. By incorporating the components of each stage in a common casing structure, the external piping is minimized and the risk of leakage is reduced.

10 Claims, 6 Drawing Sheets

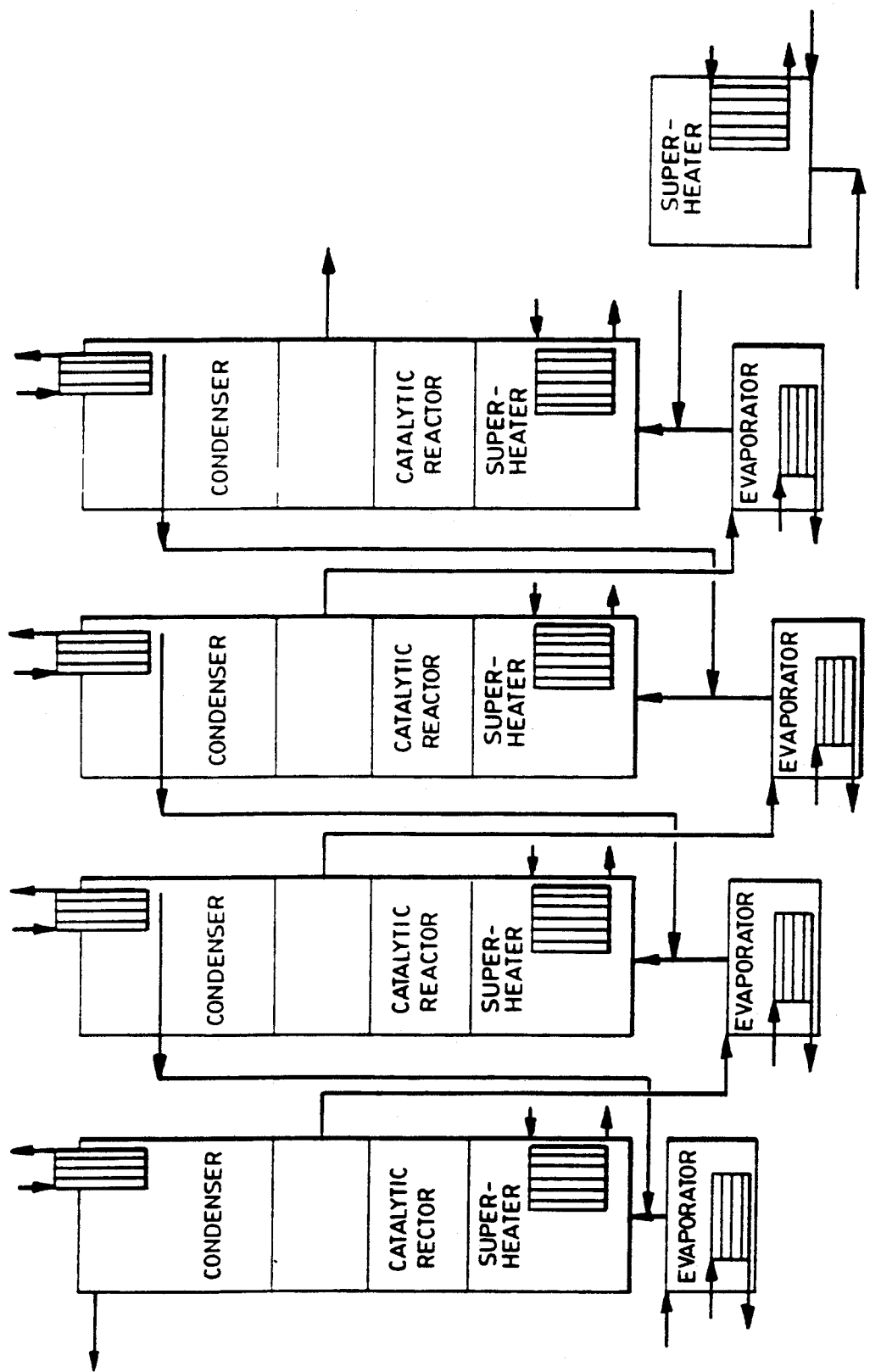

VAPOUR PHASE CATALYTIC EXCHANGE APPARATUS

This invention relates to an improved vapour phase catalytic exchange (VPCE) reactor for catalytic equilibration of hydrogen isotopic concentrations between water and hydrogen gas.

In a water-moderated nuclear power plant, heavy or light water serves as a moderator to slow down high speed neutrons, as a reflector to deflect slowed-down neutrons back towards the fuel, and also as a coolant. Heavy water is the preferred moderator as it is about 300 times less absorbent to neutrons than light water and so the critical quantity of uranium is reduced. Whereas enriched uranium must be used in the case of a light water moderator, heavy water permits the use of naturally occurring uranium.

In a heavy water reactor tritium is produced in the course of time by the absorption of neutrons by the deuterium nuclei, with consequent depletion of the heavy water. It is necessary to remove the highly radioactive tritium gas, and in addition it is necessary to remove the light water component continuously to prevent dilution of the heavy water content.

In order to remove the tritium and excess light water, a combined tritium and hydrogen extraction plant was constructed at Grenoble, France. The plant was designed to extract tritium at the rate 160,000 Ci annually, and light water at the rate 160 l. annually. The plant employs the vapour phase catalytic exchange process, which process has been described in various papers. For example, Damiani et al described the VPCE process, and the design and construction of the plant at Grenoble in considerable detail [Sulzer Technical Review No. 4, 1972 - "Tritium and Hydrogen Extraction Plants for Atomic Power Reactors".] Sood and Kveton described another tritium removal system for use with a CANDU reactor [Ontario Hydro—"Tritium Removal System for Pickering", 1981]. Davidson et al described the commissioning and operating experience at a tritium removal plant ["Fusion Technology" 1988, pp 1373–1380].

In these systems the vapour phase catalytic exchange process has proved effective. In this process, which is a multistage process for the catalytic equilibration of hydrogen isotopic concentrations between water and hydrogen gas, the two exchange media, hydrogen and water, flow countercurrently from stage to stage and within each stage are first mixed with co-current contact in the presence of a platinum catalyst, then separated in a condenser for countercurrent advancement to opposite contacting stages. Each stage comprises essentially four components, namely, an evaporator in which tritium-rich water is converted into steam, a superheater in which the mixture of vapour and hydrogen is heated to approximately 200° C., a catalytic reactor in which isotopic equilibration is completed, and a condenser from which water flows to the subsequent stage for contact with leaner hydrogen and the enriched hydrogen flows to the preceding stage for contact with richer water. A number of such stages may be cascaded.

Thus, each stage of the vapour phase catalytic exchange process has four major components. The four components are necessarily interconnected by piping and valves, and in a multistage system the stages are themselves interconnected. The space taken up by the various components is very considerable. Furthermore, the extensive piping requires a large number of pipe joints which are potential sources of leaks. To reduce the likelihood of leakage of radioactive gas and vapour, stringent safety measures have to be taken, and in consequence the space occupied by the system is further increased.

The present invention provides an improved system which occupies considerably less space than a conventional system of the same capacity. This is achieved by integrating the components of each stage of a multistage apparatus into a single structure.

Preferred embodiments of the invention will now be described, by way of example, with reference to the accompanying drawings, in which:

FIG. 6 is a schematic diagram illustrating a four-stage VPCE plant employing an alternative arrangement of reactors of the kind shown in FIG. 3;

FIG. 7 illustrates a detail of a modification of FIG. 6.

Figure 1:
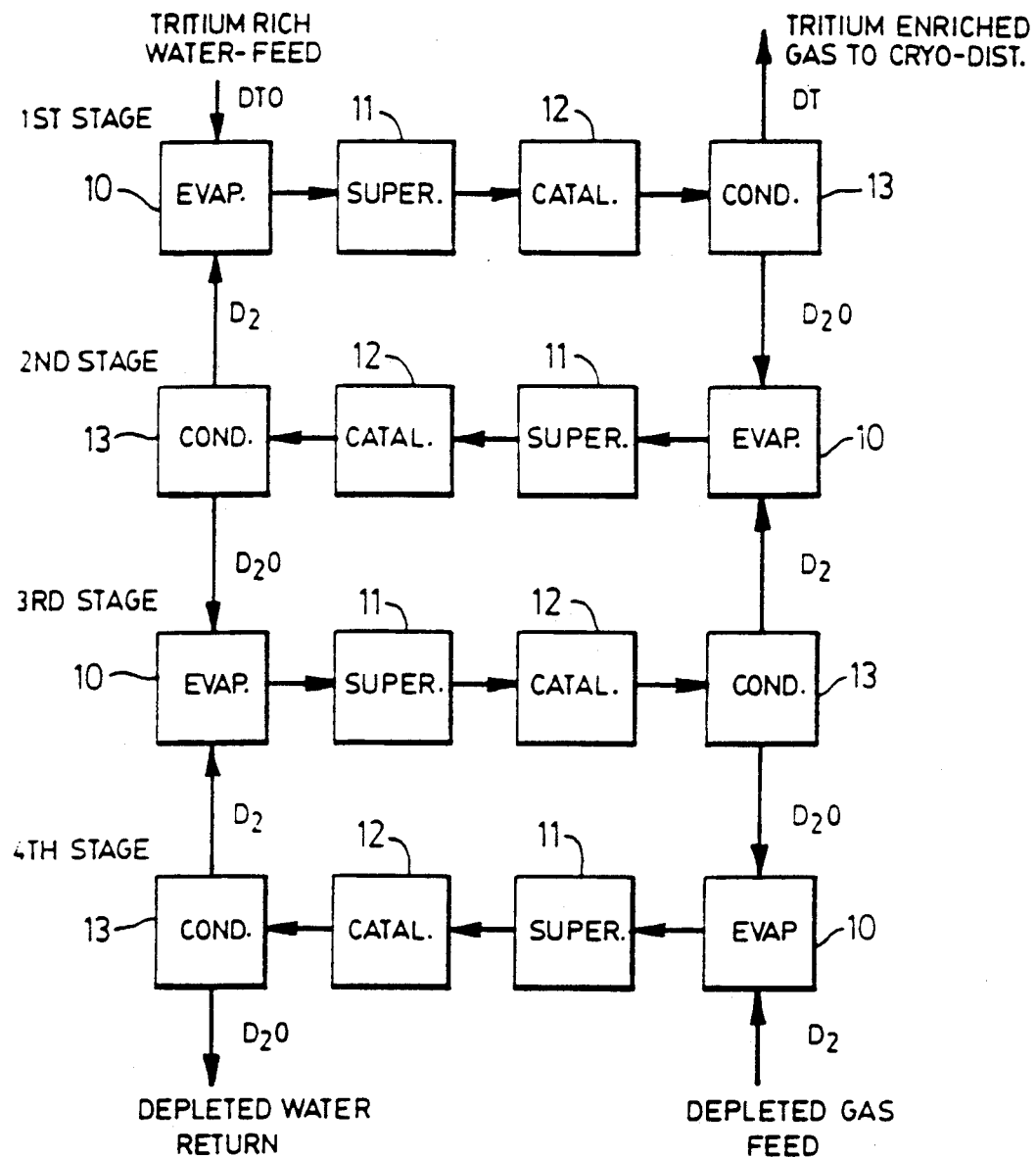
FIG. 1 is a flow diagram illustrating a conventional multi-stage VPCE process.

Referring to FIG. 1, tritium is extracted from heavy or light water rich in tritium by a reactor comprising a number of stages, four stages being shown for simplicity. Each of the stages comprises essentially an evaporator 10, a superheater 11, a catalytic reactor 12 and a condenser 13. These components of the various stages are interconnected by piping as shown in FIG. 1, and their respective functions are as follows.

In the description which follows, specific reference is made to the extraction of tritium from tritium-rich heavy water according to the reaction $$DTO + D_2 \rightarrow D_2O + DT$$

However, it is to be understood that the apparatus is useful in the extraction of tritium from tritium-rich heavy or light water according to any of the following reactions:

$$DTO + D_2 \rightarrow D_2O + DT$$

$$HTO + H_2 \rightarrow H_2O + HT,$$

$$HTO + HD \rightarrow HDO + HT,$$

or more generally $$QTO + Q_2 \rightarrow Q_2O + QT$$

where Q denotes either of the hydrogen isotopes H and D.

The tritium-rich heavy water (DTO) from a nuclear reactor, or heavy water ($D_2O$) from a preceding stage, is delivered into the evaporator 10 by a metering pump (not shown). The evaporator converts the water to steam which is mixed with tritium-lean deuterium ($D_2$) delivered from the subsequent stage, or in the case of the final stage with tritium-lean deuterium from a supply tank. This mixture is fed to the superheater 11 where it is superheated to 200° C. for subsequent catalytic exchange. The superheated gas-steam mixture passes to the catalytic reactor 12 where in contact with a platinum catalyst the following reaction takes place:

$$DTO + D_2 \rightarrow D_2O + DT$$

Isotopic equilibration takes place and part of the tritium is transferred from the tritium-rich heavy water to the tritium-lean gas. The equilibrated mixture passes to the condenser 13 where the tritium-lean water is condensed and separated from the tritium-enriched gas. The condensed water is fed to the evaporator of the succeeding stage, or in the case of the final stage to the lean water return. The tritium-rich gas is fed back to the evaporator 10 of the preceding stage, or in the case of the first stage is fed to a cryo-distillation unit.

As will be apparent from the scheme shown in FIG. 1, the design of such a plant based on convention practice requires extensive piping interconnecting the components of the various reactors, with many joints which are potential sources of leakage of radioactive substances such as tritium gas and tritiated water.

Figure 2:
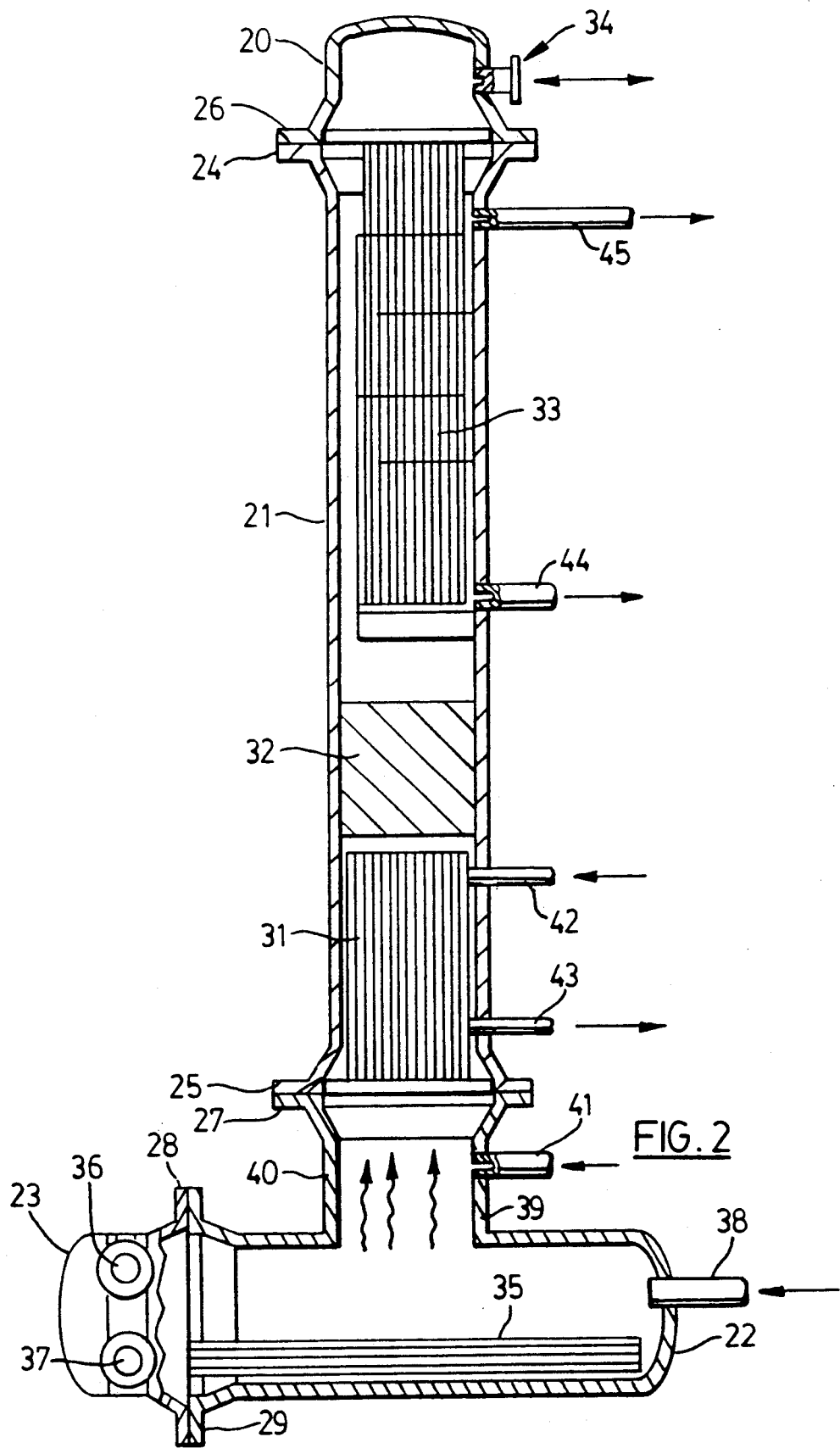
FIG. 2 is a part-sectional elevation of a VPCE reactor according to the present invention.

According to the present invention the components of each stage are integrated into a single casing structure, thus eliminating the piping between its components. This construction has the further advantage of compactness to facilitate enclosure of the system in a secondary pressure vessel, as may be required for safety reasons in high tritium applications. As shown in FIG. 2, the casing structure is made up of a number of casing sections 20, 21, 22 and 23. The casing section 21 consists of a vertical steel cylinder having upper and lower flanges 24, 25 to which the casing section 20 having a flanged opening 26 and the casing section 22 having a flanged opening 27 are respectively bolted. The casing section 23 having a flanged opening 28 is bolted to a flanged opening 29 of the casing section 22. The four casing sections when joined together as illustrated form a unitary pressure vessel housing the components of the reactor. The joints between sections must be leaktight to prevent leakage of steam and gases; this may be achieved by seal welding the flanged joints between the sections.

The vertical cylinder 21 houses the superheater 31, the catalytic reactor 32, and the condenser 33. Cooling fluid for the condenser 33 is supplied from a header within the casing section 20, the latter having inlet and outlet connections 34. The casing section 22 houses the evaporator 35, which in the present example comprises a tubular heat exchanger. The tubes of the heat exchanger extend horizontally, steam being admitted to the tubes from the casing section 23 having inlet and outlet connections 36, 37 for the steam. Tritium-rich water to be treated is admitted to the casing section 22 from the condenser of the preceding stage, or in the case of the first stage from the nuclear reactor itself, through an inlet pipe 38.

The casing section 22 of the evaporator has a neck portion 39 defining a mixing and entrainment separation chamber 40 adjacent to the superheater 31. The neck portion 39 has an inlet 41 through which tritium-lean gas is supplied to the mixing chamber 40 from the subsequent stage or, in case of the final stage, from a source of deuterium. In operation of the reactor, the mixture of tritium-lean gas and steam from the evaporator section is passed to the superheater 31. The superheater 31 in the present embodiment of the invention comprises a tubular heat exchanger the tubes of which are vertically oriented within the casing 21. Heating fluid is supplied to the tubes of the heat exchanger via inlet and outlet connections 42, 43.

It will be appreciated that the heating of the evaporator section and/or the superheater section of the reactor may alternatively be accomplished by electrical heating elements instead of heat exchangers supplied with heating fluids from external sources as shown.

The superheated mixture of tritium-lean gas and tritium-rich steam passes to the catalytic reactor bed 32 at a temperature of approximately 200° C. where an exchange of isotopes takes place. The tritium-lean gas receives tritium from the steam while part of the tritium of the steam is replaced by deuterium. The resultant mixture passes to the condenser 33.

The condenser 33 comprises a vertically oriented tubular heat exchanger mounted within the upper part of the cylindrical casing 21. As previously mentioned, cooling fluid is supplied to the tubes of the condenser from a header within the casing section 20. Cooling of the steam/gas mixture results in separation of the condensed steam. The depleted water passes to the evaporator section of the subsequent stage, or in the case of the final stage to the lean water return, via an on output pipe 44. The tritium-enriched gas passes via an outlet pipe 45 to the mixing chamber of the preceding stage, or in the case of the first stage to the cyro-distillation unit.

All the stages of the tritium separation plant are constructed in the same manner, the stages being interconnected as described so as to effect countercurrent flow of the deuterium and the tritiated water from stage to stage. Thus, tritium-rich water is fed to the evaporator section of the first stage, the depleted water being taken from the condenser section of the final stage, while tritium-lean deuterium gas is fed to the evaporator section of the final stage, the enriched deuterium being taken from the condenser section of the first stage and passed to the cryo-distillation unit.

In a modification of the tritium separation plant described with reference to FIG. 2, the evaporator section of the first stage is omitted, the water to be treated being passed directly from the nuclear reactor to the evaporator section where it is mixed with the tritium-lean deuterium gas.

Figure 3:
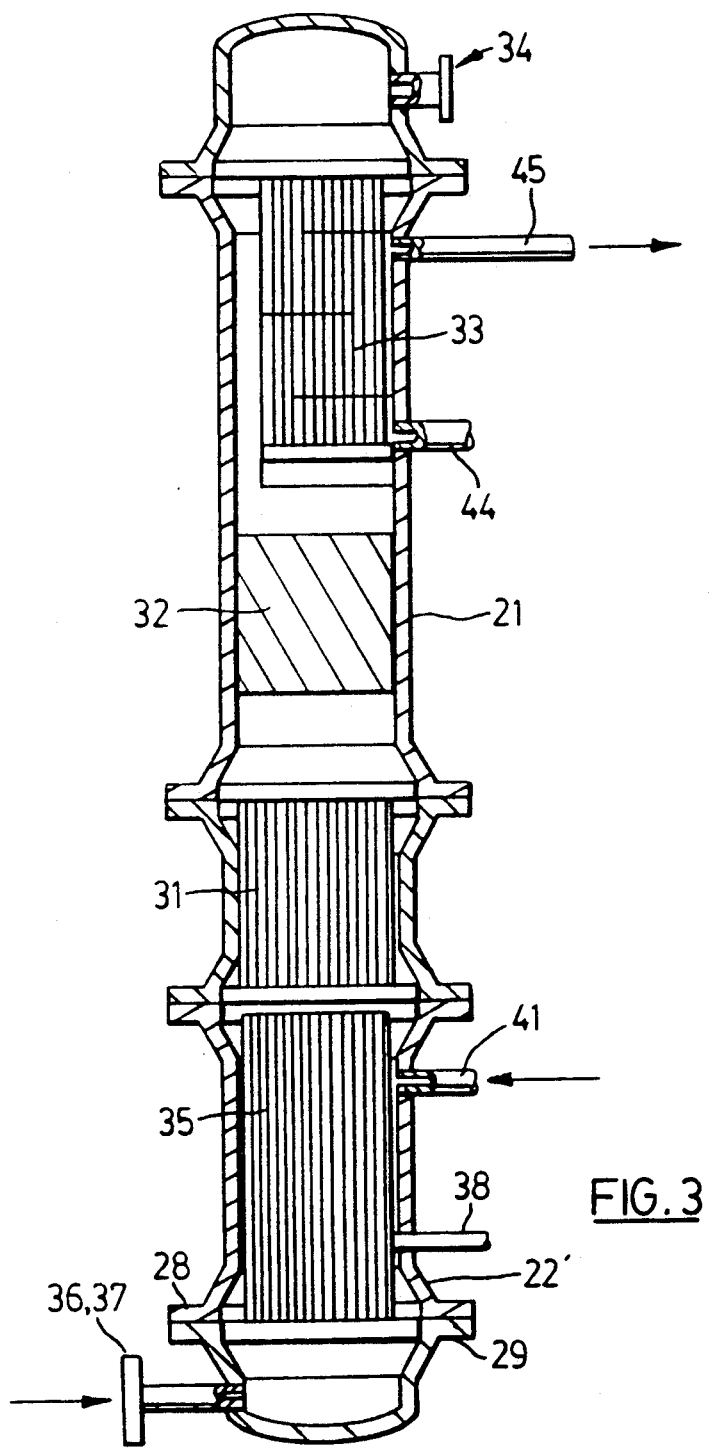
FIG. 3 is a part-sectional elevation of an alternative VPCE reactor according to the invention.

An alternative VPCE reactor constituting one stage of the tritium separation plant is illustrated in FIG. 3. In this reactor the evaporator casing 22' is a vertical cylinder aligned with the casing section 21, the tubes of the evaporator 35' being vertically oriented within the casing section 22'. Otherwise, the construction of the reactor is essentially as described with reference to FIG. 2 and corresponding parts are denoted by the same reference numerals.

Figure 4:
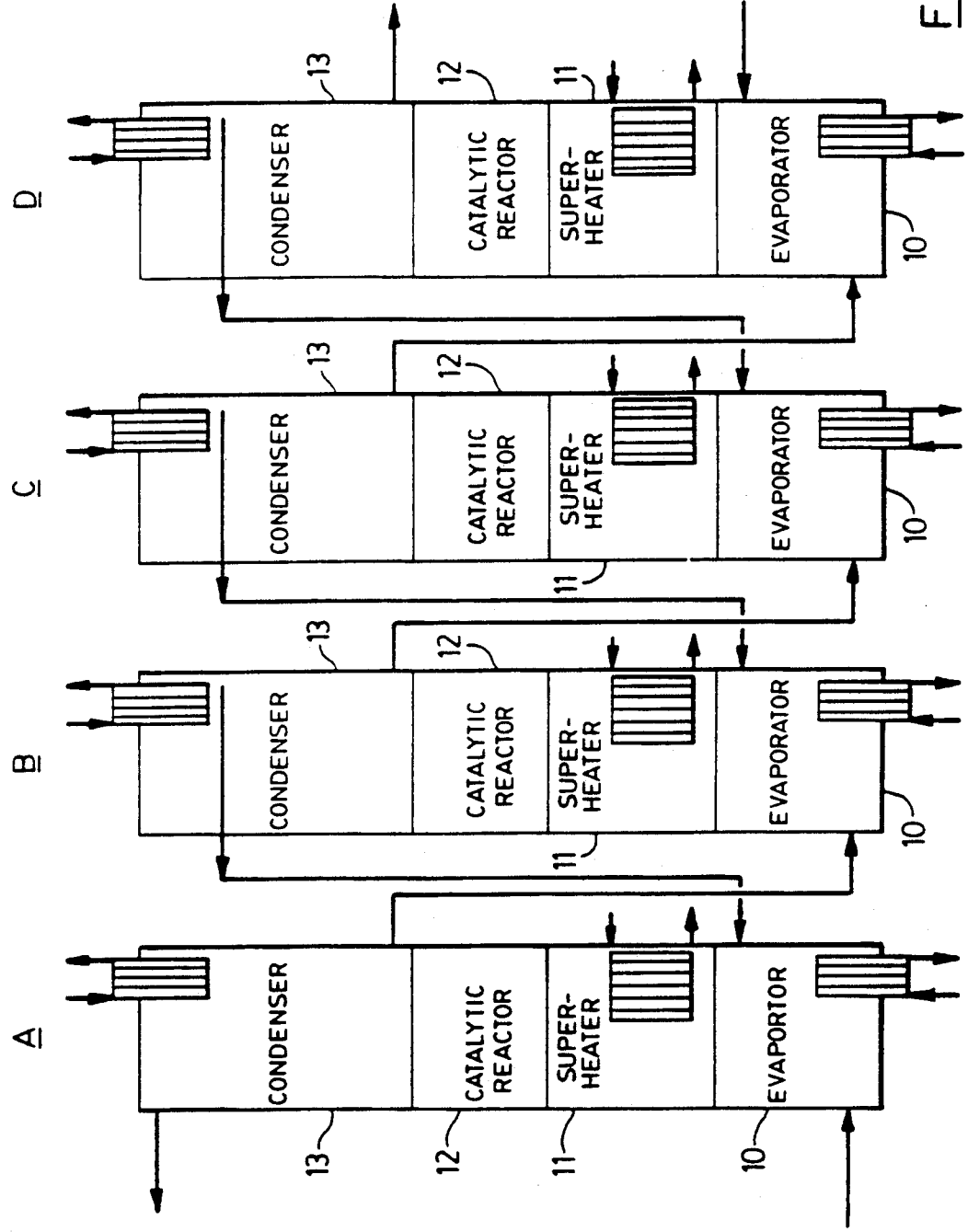
FIG. 4 is a schematic diagram illustrating a four-stage VPCE plant employing reactors of the kind shown in FIG. 3.

FIG. 4 shows schematically an arrangement of reactors of the kind shown in FIG. 3, the essential components of the four stages and their various connections being denoted by the same reference numerals as are shown in FIGS. 1 and 3 to identify the corresponding parts. In this arrangement the first, second, third and fourth stages are identified by the references A, B, C and D respectively. The reactors of the four stages are vertically oriented, the condensed water flowing from the respective condenser sections under gravity.

Figure 5:
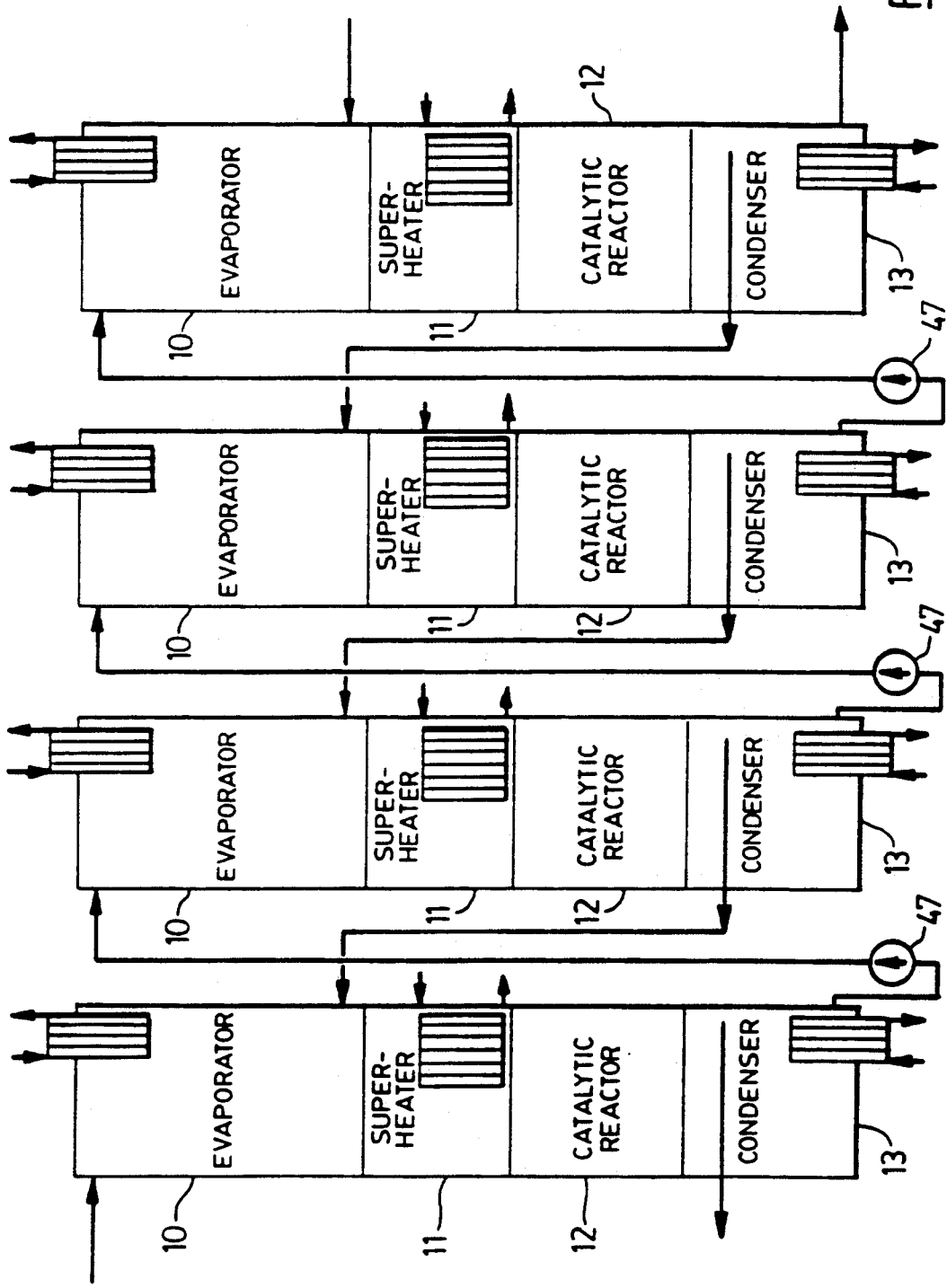
FIG. 5 is a schematic diagram illustrating a four-stage VPCE plant employing an alternative arrangement of reactors of the kind shown in FIG. 3.

FIG. 5 shows schematically an alternative arrangement of reactors of the kind shown in FIG. 3, wherein the reactors are inverted so that the evaporators are at the top of each stage and the condensers are at the bottom. In this arrangement pumps 47 are used to pump the condensed water from each stage to the evaporator of the subsequent stage. This provides convenient flexibility in the layout of the tritium separation plant and it will be particularly noted that the reactors of the various stages may be arranged horizontally instead of vertically as previously described.

FIG. 6 shows schematically yet another alternative arrangement in which the reactors are of the kind shown in FIG. 2, but in which the evaporators 10 are omitted from the integrated casing structures of the various stages and replaced by independent evaporator sections 50 which are interconnected with the respective superheater sections 12 by piping 51. As shown in the fragmentary view in FIG. 7, the evaporator section of the first reactor stage may be omitted altogether, the water to be treated being received directly from the nuclear reactor as steam and fed directly to the superheater 11 of the first stage by piping 42.

As previously mentioned, the reactors are useful in the extraction of tritium from heavy or light water by catalytic reaction with either or both of the hydrogen isostopes (H) and (D). In the following claims the term "water" means heavy or light water and the term "hydrogen" means light hydrogen (H) or deuterium (D).

I claim:

1. A vapour phase catalytic exchange reactor for use in the separation of tritium from tritiated water by reacting the water as superheated steam with tritium-lean hydrogen and separating the reaction products thereof, the reactor comprising a superheater section, a catalytic reactor section and a condenser section, said sections being interconnected in series, characterized in that said sections are integrated into a unitary casing structure, said casing structure providing means for admitting a mixture of tritiated steam and tritium-lean hydrogen to the superheater section, internal support means for supporting a catalyst in the catalytic reactor section, first outlet means connected to the condenser section for draining condensate therefrom, and second outlet means connected to the condenser section for venting hydrogen gas therefrom.

2. A vapour phase catalytic exchange reactor according to claim 1, further comprising an evaporator section, said evaporator section being integrated into said casing structure adjacent to the superheater section and providing first and second inlet means for feeding the tritiated heavy water and the tritium-lean hydrogen thereto.

3. A vapour phase catalytic exchange reactor according to claim 2, said evaporator section including a mixing chamber from which the mixture of tritiated steam and tritium-lean hydrogen pass to the superheater.

4. A vapour phase catalytic exchange reactor according to claim 1, wherein the casing structure comprises a first casing section comprising an elongate cylinder having a flanged opening at each end, the openings being closed by respective second and third flanged casing sections secured to the end flanges of the cylinder, the interconnected sections forming a unitary pressure vessel.

5. A vapour phase catalytic exchange reactor according to claim 2, wherein the casing structure comprises a first casing section comprising an elongate cylinder having a flanged opening at each end, and respective second and third flanged casing sections secured to the end flanges of the cylinder and forming therewith a unitary pressure vessel, said third flanged casing section housing said evaporator section and said first casing section housing the superheater section, the catalytic reactor section, and the condenser section.

6. A multistage tritium separation plant comprising a plurality of reactors as claimed in claim 1 interconnected to effect countercurrent flow of the water and hydrogen from stage to stage with co-current contact in the catalytic reactor section of each stage, wherein the casing structure of each reactor is a vertically oriented, elongate pressure vessel, the superheater, catalytic reactor and condenser sections thereof being in substantial vertical alignment.

7. A multistage tritium separation plant according to claim 6, wherein the casing structure of each reactor comprises a first casing section comprising an elongate cylinder having a flanged opening at each end, the openings being closed by respective second and third flanged casing sections secured to the end flanges of the cylinder.

8. A multistage tritium separation plant according to claim 7, wherein each reactor further comprises an evaporator section integrated into the casing structure, the interconnected sections forming a unitary pressure vessel.

9. A multistage tritium separation plant according to claim 7, wherein the reactor of the first stage is connected to receive tritiated water from an external supply and wherein the reactor of each subsequent stage includes an evaporator section integrated into the casing structure thereof.

10. A multistage tritium separation plant according to claim 8 or claim 9, wherein the interconnections between the reactors provide for gravitational flow of condensate from the condenser section of each stage to the evaporator section of the adjacent subsequent stage.

* * * * *